United States Patent [19]

Sampson et al.

[11] Patent Number: 4,840,451
[45] Date of Patent: Jun. 20, 1989

[54] SHIELDED FIBER OPTIC CONNECTOR ASSEMBLY

[75] Inventors: Stephen A. Sampson, Downers Grove; Philip J. Dambach; David L. Brunker, both of Naperville, all of Ill.

[73] Assignee: Molex Incorporated, Lisle, Ill.

[21] Appl. No.: 130,145

[22] Filed: Dec. 8, 1987

[51] Int. Cl.$^4$ .............................................. G02B 6/36
[52] U.S. Cl. ............................. 350/96.20; 350/96.21
[58] Field of Search ............... 350/96.20, 96.21, 96.22; 339/19

[56] References Cited

U.S. PATENT DOCUMENTS

| | | |
|---|---|---|
| 4,190,316 | 2/1980 | Malsby et al. |
| 4,406,514 | 9/1983 | Hillegonds et al. ............... 350/96.21 |
| 4,432,604 | 2/1984 | Schwab ................................ 350/96.2 |
| 4,449,784 | 5/1984 | Basov et al. ........................ 350/96.21 |
| 4,465,333 | 8/1984 | Caserta et al. ..................... 350/96.21 |
| 4,549,783 | 10/1985 | Schmachtenberg, III ....... 350/96.20 |
| 4,591,231 | 5/1986 | Kaiser et al. ...................... 350/96.18 |
| 4,595,839 | 6/1986 | Braun et al. ....................... 350/96.23 |
| 4,678,264 | 7/1987 | Bowen et al. ..................... 350/96.21 |
| 4,721,358 | 1/1988 | Faber et al. ....................... 350/96.2 |
| 4,762,388 | 8/1988 | Tanaka et al. .................... 350/96.20 |

Primary Examiner—Leon Scott, Jr.
Attorney, Agent, or Firm—John W. Cornell; Louis A. Hecht

[57] ABSTRACT

An improved fiber optic connector assembly for connecting the ends of optical fibers to OED lenses is provided by a plug connector including a front mating end and a corresponding number of fiber receiving channels. Each channel includes an enlarged generally cylindrical portion adjacent the front end wherein the optical fiber end is coaxially positioned. The plug connector is mateable with a receptacle connector including a housing having a plug receiving socket with a front opening and a rear wall. The rear wall includes a corresponding number of spaced interface apertures aligned with each OED lens. A plurality of tubular projections coaxially aligned with and surrounding each aperture extend forwardly into the plug-receiving socket. As the plug connector is inserted into the socket, the tubular projections are received within the enlarged portions of the fiber receiving channels surrounding the fiber ends and the ends of the optical fibers are guided by the tubular projections into abutting coaxial alignment with the apertures and lenses, respectively. In a preferred embodiment, the receptacle connector housing is formed of die cast zinc to provide a shielded fiber optic link connector assembly for connecting a CPU to peripheral equipment which is characterized by reduced or eliminated EMI emissions. In an especially preferred embodiment, a shielded connector assembly including an integral switch feature is provided.

22 Claims, 4 Drawing Sheets

SHIELDED FIBER OPTIC CONNECTOR ASSEMBLY

BACKGROUND OF THE INVENTION

The present invention relates to fiber optic links for connecting, for example, the central processing unit (CPU) of a computer to peripheral equipment such as monitors, printers, modems and the like. More particularly, it relates to a fiber optic connector assembly including mateable plug and receptacle connectors having cooperative mating structures which ensure accurate coaxial alignment of optical fiber ends in an optical cable with opto-electronic devices (OEDs) associated with an electrical component. In a preferred embodiment, a connector arrangement exhibiting exceptional electromagnetic interference (EMI) shielding is provided.

Fiber optic technology is increasingly used both in conjunction with and in place of conventional electrical circuits and components for a variety of different functions. In particular, it is especially desired in the field of data transmission to substitute fiber optic technology for more conventional copper technology, whenever possible. One reason for this is that fiber optic connections per se are generally less sensitive to EMI effects and exhibit reduced EMI emissions, as compared with their conventional counterparts. As a consequence, fiber optic transmission lines generally do not have to be as rigorously shielded against EMI. Another major reason is that fiber optic systems are able to handle more data, transmitted at higher data rates than copper-based components.

Different known fiber optic connectors are used for interconnecting fiber optic cables and for interconnecting OEDs to fiber optic cables. Examples of fiber optic connectors are disclosed in U.S. Pat. Nos. 4,167,303 issued Sept. 11, 1979 to Bowen et al., 4,534,616 issued Aug. 13, 1985 to Bowen et al., and 4,547,039 issued Oct. 15, 1985 to Caron et al. and Japan Patent 58-58510 published Apr. 7, 1983. Disadvantages of the known fiber optic connectors are their complexity and the resulting difficult and painstaking assembly required.

For example, each of the above-identified patents describes a fiber optic plug and receptacle connector system requiring a multitude of additional parts, other than the plug connector per se and the receptacle connector housing, to ensure proper positioning and alignment of the optical fiber end to the lens of the OED. These additional parts require considerable assembly steps, increase inventory requirements and add to the cost of the connectors.

Another major disadvantage of the above-cited connectors is that they do not provide an adequately shielded receptacle arrangement for modern computer link applications. Generally, the CPU of a computer generates relatively large amounts of EMI emissions. CPUs are generally shielded in accordance with FCC regulations to reduce EMI emissions emanating from a CPU from entering the environment in an effort to reduce EMI effects from interfering with telecommunications signals used by the general public. In many modern computer applications, the security of the computerized information is important. For these applications, preventing EMI emissions from escaping from a CPU is especially desired because these EMI emissions may be picked up by nearby receivers. The received emissions may be used by unauthorized persons to reconstruct the computer intelligence signals which generated the EMI emissions.

In accordance with modern applications, the fiber optic cable link may be used to connect the CPU of a computer to peripheral equipment. Generally, a metallic cabinet or housing connected to ground surrounds the internal components of a CPU to provide a shielded enclosure. Input/output (I/O) ports including receptacle connectors mounted in a housing panel must now be similarly shielded to maintain the shielded enclosure and protect the environment from undesirable effects of EMI escaping through the I/O ports. The above-cited patents do not describe or suggest the provision of adequate shielding for these applications.

Recently, there has been a dramatic expansion in the computer peripherals market, not only in terms of the types of peripheral devices available, but also in terms of their capabilities. For example, CRT monitors are available in color as well as monochrome, and may be of a high resolution or standard resolution type. Printers are available which can receive one or more character formats and/or are capable of printing at differing printer head rates. Various equipment including monitors and printers, as well as modems are now available which are capable of operating under one or more data transmission rates or baud rates.

CPUs are now capable of transmitting output data signals appropriate to each type and grade of peripheral equipment and most have multiple capabilities. It is desirable to be able to use the same I/O port of a computer to connect these varying types of peripheral equipment to the CPU. In this context, it is especially desired to provide a shielded switch integral to the connector arrangement capable of expressing at least one piece of binary information to the CPU to identify the type of peripheral equipment being linked with it, e.g., a color monitor vs a monochrome monitor, or a high resolution vs a standard resolution monitor, and so on. The provision of such a switch may permit the CPU to internally format the output to an appropriate form for that particularly identified peripheral equipment.

SUMMARY OF THE INVENTION

It is a primary object of the present invention to provide an improved fiber optic connector for connecting optical fibers to OEDs. Other objects are to provide a fiber optic connector assembly that is simple and inexpensive to make and to assemble; to provide such assembly including a receptacle connector and a plug connector that assembled together precisely locate the end of an optical fiber to the lens of an OED device; to provide such assembly that provides effective EMI shielding; to provide such assembly including an electrical switch to provide an identification function for the plug connector in mated assembly with the receptacle connector; and to provide such assembly overcoming disadvantages of known fiber optic connectors and assemblies.

In accordance with the present invention, a new and improved fiber optic connector assembly is provided for connecting the ends of one or more optical fibers to a corresponding number of OED lenses. The connector assembly comprises a plug connector including an elongate housing having a front mating end with at least one opening, a rear end with at least one opening and a corresponding number of optical fiber-receiving channels extending between said openings. Each channel includes an enlarged generally cylindrical portion adjacent the front end wherein each optical fiber end is coaxially positioned.

The connector assembly further comprises a receptacle connector including a housing having a plug receiving socket with a front opening and a rear wall. The rear wall of the receptacle housing includes a corresponding number of spaced, light interface apertures, each aperture being coaxially aligned with one OED lens. A plurality of tubular projections coaxially aligned with and surrounding each light interface aperture extend forwardly from the rear wall into the plug-receiving socket.

In accordance with the present invention, as the plug connector is inserted in the socket, the tubular projections in the socket are received within the enlarged portions of the fiber-receiving channels surrounding the fiber ends in the plug connector. Simultaneously, the optical fibers are guided by the tubular projections into abutting coaxial alignment with the apertures and lenses, respectively.

In its broadest aspect, the present invention provides an improved connector arrangement capable of accurately positioning and coaxially aligning the optical fiber end with an OED lens without the need for additional lenses therebetween and without the need for additional conical ferrule structures to be assembled onto the fiber ends prior to assembly in the plug connector for mating with the receptacle connector.

In a preferred embodiment, the plug connector includes a two-piece housing which may be heat staked together over the end portion of the fiber optic cable. The rear end of the plug connector is preferably provided with cable strain relief means. Each optical-fiber receiving channel may additionally include a fiber gripping portion including means for retaining the end portions of the optical fibers within the channels.

The receptacle connector is preferably molded as an integral unitary part and may be formed from a moldable thermoplastic resin composition which is electrically non-conductive, or a conductive polymer composition may also be employed if shielding is desired. Means for mounting the OEDs to the receptacle housing are provided to maintain coaxial alignment of each OED lens with one of the light interface apertures.

In accordance with an especially preferred embodiment, the receptacle connector housing is metallic and formed of die-cast zinc. The preferred zinc receptacle connector housing may be mounted in a panel of a shielded enclosure. A shielded switch assembly is provided and disposed on the rear wall of the receptacle housing opposite the socket. The switch assembly is effective to transmit one piece of binary information to a CPU or other component to which the receptacle connector and OED's are attached or connected.

The preferred switch assembly includes an elongate switch arm or blade which is cantilever-mounted at one end to the rear wall and having an opposed free end. A switch contact pin is disposed adjacent the free end of the switch arm and spaced from the rear wall. A switch aperture is provided extending through the rearwall of the receptacle housing. In accordance with this embodiment some of the mateable plug connectors are provided with a forwardly projecting switch boss extending from the front end of the plug. The switch boss on the plug connector is received through the switch aperture in the rearwall of the receptacle connector a distance sufficient to move the switch arm away from the rear wall into electrical contact with the switch pin.

The switch boss and switch assembly may provide an identification for the remote component which is connected to the other end of the fiber optic cable.

For example, the preferred receptacle connector may form an I/O port for a central processing unit to which the fiber optic cable of a television monitor is to be attached. The mating plug connector of this invention may be used on a fiber optic cable linking a color monitor or a monochrome monitor through the receptacle connector to the CPU. In accordance with this invention, the switch boss may be provided on monochrome monitors only, so that the receptacle switch is closed upon mating with a monochrome plug, but not upon mating with a color monitor plug. In accordance with this illustrative arrangement, the CPU may be programmed to send an output signal appropriate for a color monitor unless the switch is actuated to a closed position. If the switch is closed, a signal may be sent to the CPU to tailor the output to a signal appropriate for a monochrome monitor. In this manner, the switch assembly and switch boss arrangement may be used to transmit a single piece of identifying binary code or information to a CPU.

In accordance with the preferred embodiment, every aperture extending through the rear wall of the socket is designed to provide an aperture length to aperture diameter ratio of at least about 3 to 1 to provide maximum EMI shielding effectiveness, to substantially prevent EMI from exiting a shielded CPU enclosure through the receptacle connector.

BRIEF DESCRIPTION OF THE DRAWING

The present invention together with the above and other objects and advantages may be best understood from the following detailed description of the embodiment of the invention illustrated in the accompanying drawings, wherein.

DETAILED DESCRIPTION OF THE PREFERRED EMBODIMENT

Figures 1, 9:
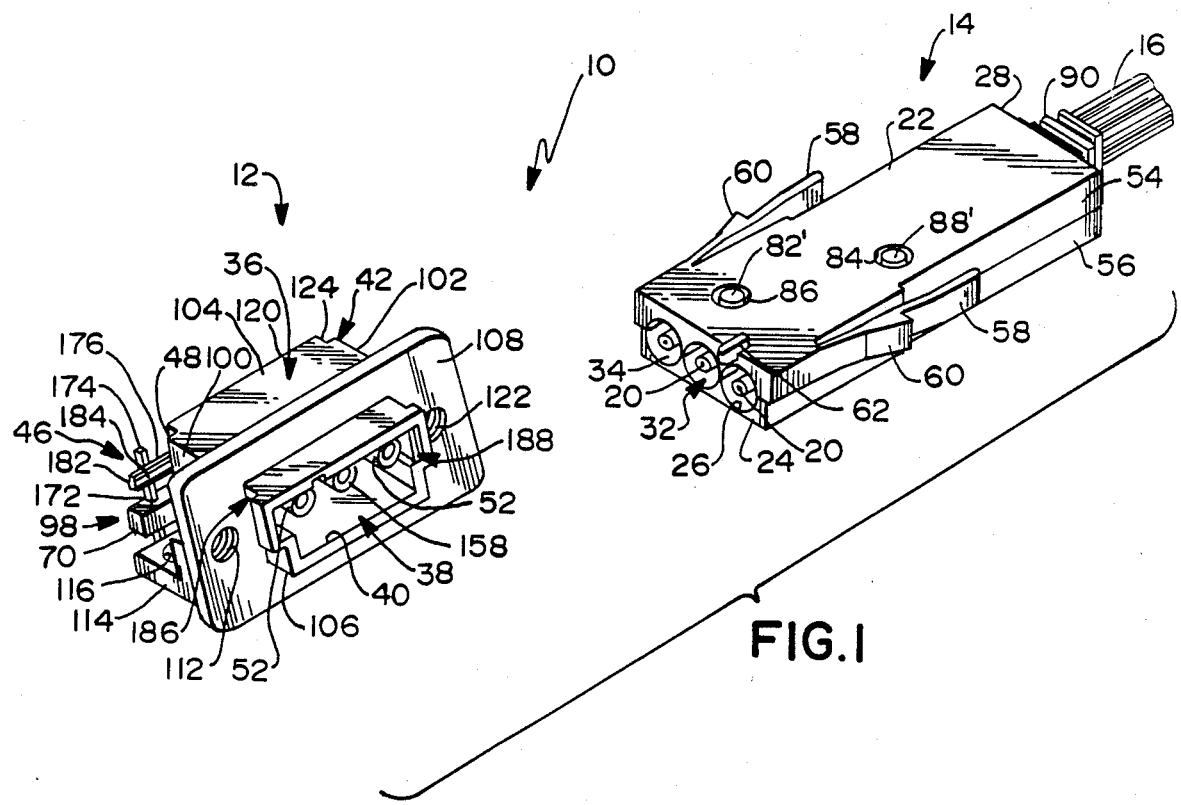
FIG. 1 is a perspective view of a fiber optic connector assembly constructed in accordance with the present invention.
FIG. 9 is an enlarged top elevational view of the interior of one half of the fiber optic plug connector of the assembly of FIG. 1.

Referring now to FIG. 1, the preferred embodiment of the new and improved fiber optic connector assembly, generally referred to by reference numeral 10, is shown. Preferred connector assembly 10 comprises a connector assembly for connecting the ends of one or more optical fibers to a corresponding number of OED lenses characterized by improved coaxial alignment of the fiber end to the OED lens at an optical interface and by improved EMI shielding properties.

Connector assembly 10 includes a new and improved receptacle connector 12 and matable plug connector 14. Plug connector 14 is shown in use installed on an end portion of a fiber optic cable 16. Fiber optic cable 16 includes three insulated optical fibers 18 having optically finished fiber ends 20. Plug connector 14, as shown in FIGS. 1 and 9, includes an elongate housing 22 having a front mating end 24 with three openings 26, a rear end 28 with one enlarged opening 30 and three fiber-receiving channels 32 extending between openings 26 and opening 30. Each channel 32 includes an enlarged generally cylindrical portion 34 adjacent front end 24 wherein each fiber end 20 is coaxially positioned.

Figure 5:
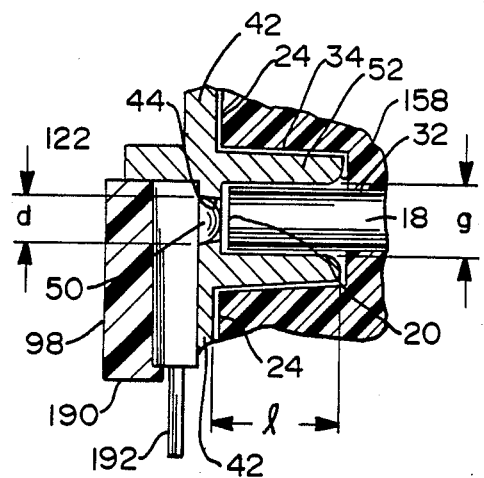
FIG. 5 is a sectional view taken along the line 5—5 of FIG. 4.
Figure 6:
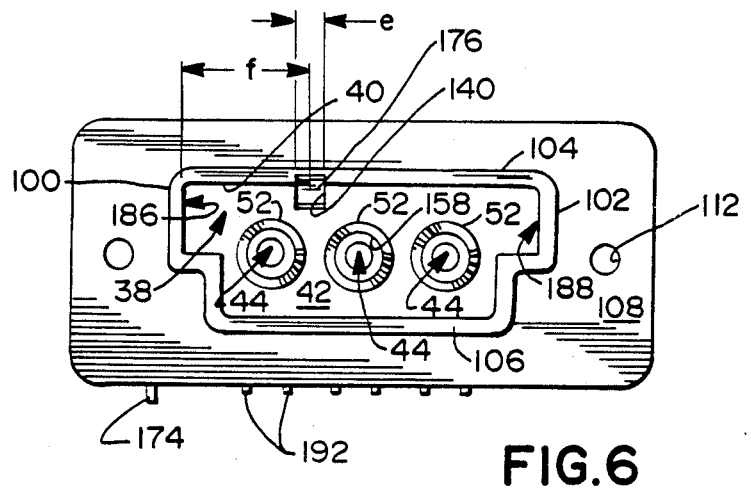
FIG. 6 is an enlarged front elevational view of the fiber optic receptacle connector of the assembly of FIG. 1.

Receptacle connector 12 includes a new and improved integral, unitary zinc die cast housing 36 having a plug receiving socket 38 with a front opening 40 and a rear wall 42. Rear wall 42 is provided with three spaced light interface apertures 44 as shown in FIGS. 2 and 4-8. Three opto-electronic devices or OEDs 46 are disposed against the outer surface 48 of rear wall 42, as shown in FIGS. 2, and 4-8. Each OED 46 includes a lens 50 which is coaxially aligned with an interface aperture 44, as shown in FIG. 5. Three tubular projections 52 coaxially aligned with and surrounding each interface aperture 44 extend forwardly from rear wall 42 into the plug-receiving socket 38, as shown in FIGS. 1 and 5-6.

In accordance with this invention, as plug connector 14 is inserted into plug receiving socket 38, tubular projections 52 are received within the enlarged portions 34 of the fiber-receiving channels 32 surrounding the fiber ends 20. Optical fibers 18 are slideably received and guided by tubular projections 52 until the fiber ends 20 are brought into generally abutting coaxial alignment with the interface apertures 44 and OED lenses 50, respectively, as shown in FIG. 5.

Referring now to the preferred embodiment shown in FIGS. 1, 5 and 9, plug connector 14 includes a housing 22 formed by heat-staking together a pair of hermaphroditic housing valves including a top half 54 and a bottom half 56. Both halves 54 and 56 are substantially identical with the exception that top half 54 is additionally provided with latch arms 58 having latch wings 60 extending therefrom. In addition, top half 54 may optionally be molded to include a forwardly projecting switch boss 62 extending from front end 24 as shown. These additional features may be readily incorporated as options in the mold design, so that advantageously both of housing halves 54 and 56 may be molded using the same mold.

The important features and assembly of plug connector 14 are shown more particularly in FIG. 9. As has been mentioned above, assembled plug connector 14 includes a front mating end 24 having three spaced apart front openings 26, a rear end 28 with a rear opening 30 and three optical fiber receiving channels 32 extending between front openings 26 and rear opening 30. Fiber receiving channels 32 are generally cylindrical and are formed by the cooperation of semi-cylindrical grooves 64 formed in a major surface of hermaphroditic housing halves 54 and 56.

More particularly, as shown in FIG. 9, grooves 64 are molded to define spaced fiber-receiving channels 32, each including an enlarged generally cylindrical portion 34 adjacent front end 24 and an intermediate fiber gripping portion 66 adjacent enlarged portion 34. Intermediate fiber gripping portions 66 are molded to define an eyelet receiving recess 70 having an enlarged flange receiving portion 72. A transition section 68 including an enlarged rectangular recess 74 is provided extending between fiber gripping portion 66 and an upstanding partition wall 76. Partition wall 76 is parallel to and spaced from rear end 28 to define a strain-relief recess 78 therebetween. Partition wall 76 is additionally provided with an opening 80 generally disposed in registration with rear wall opening 30. Housing half 54 is additionally provided with a pair of upwardly projecting heat staking posts 82 and 84 and an opposing aligned pair of post-receiving heat staking apertures 86 and 88 as shown. When housing halves 54 and 56 are assembled together posts 82 and 84 are received through complementary apertures 86' and 88' in housing half 56 and apertures 86 and 88 will receive complementary posts 82' and 84' provided on housing half 56.

Plug connector 14 is assembled by cutting an appropriate length of fiber optic cable 16. An elastomeric strain relief member 90 is overmolded onto the cable at a predetermined position in a known manner. The cable 16 is separated to sever the small intermediate webs of fused insulation joining the individual fibers together into cable 16 by cutting or pulling or otherwise, to provide three individually insulated optical fibers 18 extending forwardly of strain relief member 90. Thereafter, a cylindrical metallic eyelet 92, preferably made of brass, including an outwardly projecting radial flange 94 is slipped onto each separated insulated fiber 18. Eyelets 92 are positioned at a predetermined distance from strain relief 90 and are crimped to grippingly engage the insulation surrounding each fiber 18. Thereafter, the ends 20 of fibers 18 are optically finished or polished in accordance with conventional methods.

With the eyelets 92 crimped firmly in place on fibers 18, the eyelets are each pressed into the eyelet receiving recess 70 in the fiber gripping portion 66 in top half 54, so that the radial flanges 94 are received within the flange receiving portions 72. Strain relief member 90 is pressed into recess 78. Thereafter, the lower housing half 56 is pressed against upper housing half 54 until posts 82' and 84' extend through apertures 86 and 88 in upper housing half 54. With the plug housing 22 in assembled form the ends of posts 82', 82' and 84', 84' heat-staked over or otherwise deformed to fixedly retain the assembled plug connector 14 onto the end of cable 16.

Plug housing halves 54 and 56 may be injection molded from any suitable thermoplastic resin molding composition which provides sufficient structural integrity in use and which is sufficiently resilient to permit repeated flexing of the latch arms 58. Thermoplastic polyester and thermoplastic polycarbonate molding compositions are generally considered suitable.

In accordance with the preferred embodiment, elastomeric strain relief member 90 provides protection against rearward cable pull out and flexural relief. Eyelets 92 provide additional strain relief for optical fibers 18. Eyelets 92 also serve to fixedly position fiber ends 20 at the front end 24 of plug connector 14 and assist in positioning fiber ends 20 so that they coaxially extend within surrounding enlarged channel portions 34.

Plug connector 14 is intended to mate with the new and improved receptacle connector shown in FIGS. 1–8. In the preferred embodiment shown therein, receptacle connector 12 includes a housing 36 for receiving the plug connector 14, an electrical switch assembly 96 for detecting or identifying the mated assembly of a particular type of plug connector 14 and an OED retainer 98. Receptacle connector housing 36 is an integral, one-piece member formed of an electrically conductive material having electromagnetic interference (EMI) shielding qualities. Preferably, housing 36 is an integral unitary die-cast zinc member. OED retainer 98 is an integral one-piece body of material having strength and flexibility needed for mounting to the housing 36 and having electrically insulating qualities needed for the switch assembly 96. Preferably OED retainer 98 is molded from a thermoplastic polyester molding composition of similar thermoplastic dielectric material.

Figure 2:
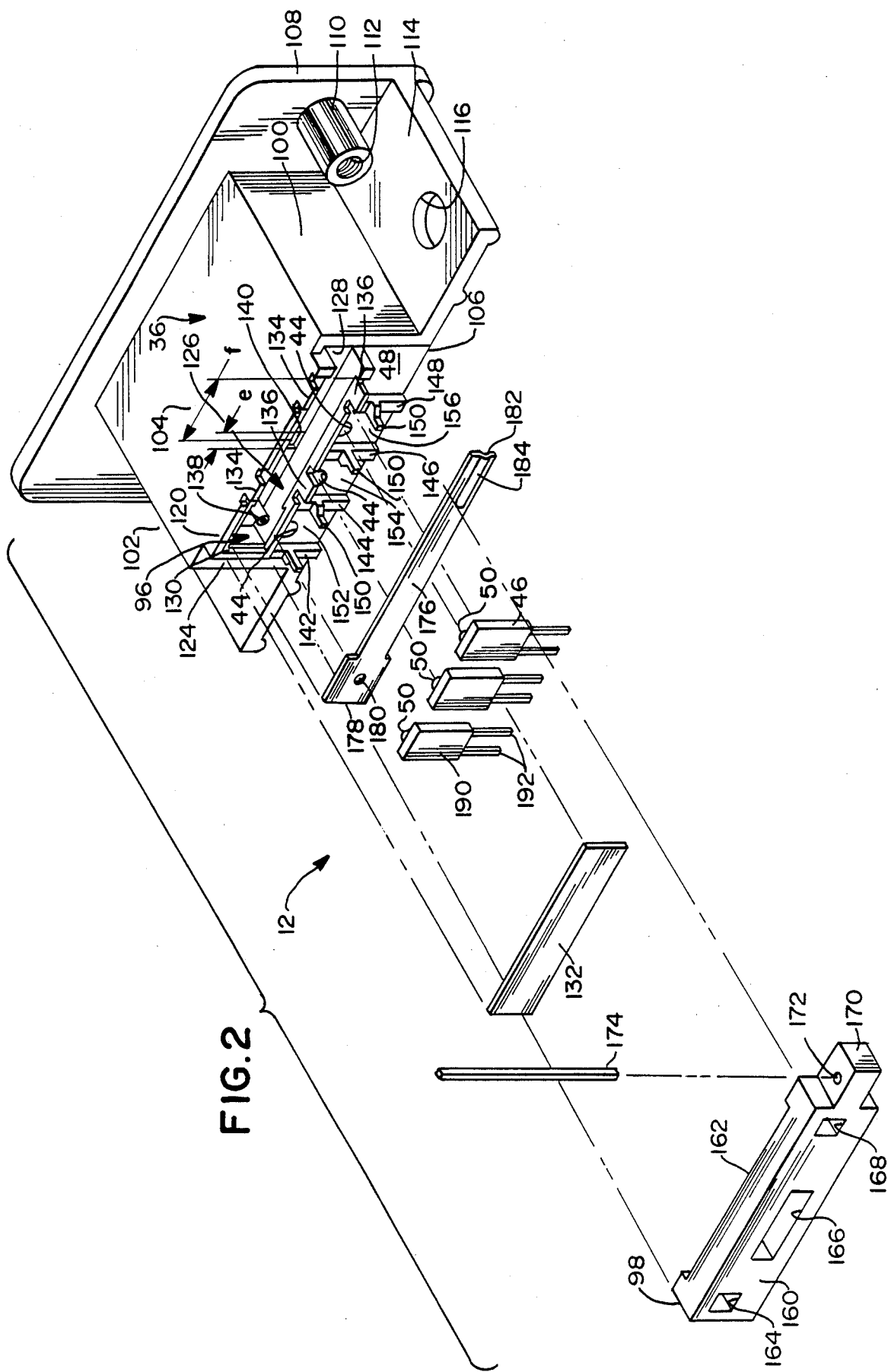
FIG. 2 is an exploded perspective view of the rear end of the fiber optic receptacle connector of the assembly of FIG. 1 illustrating the rear end, the electrical switch assembly, the OEDs and the OED retaining member.

Receptacle housing 36 defines a plug connector receiving socket 38 extending from a front opening 40 to a rear wall 42. The plug connector receiving socket 38 is defined by opposed housing sidewalls 100 and 102 and opposed top and bottom housing walls 104 and 106. A pair of cooperative latch receiving recesses 180 and 182 are provided on the inner surfaces of housing of sidewalls 100 and 102 adjacent front opening 40. A generally rectangular panel mounting flange 108 extends outwardly from the housing 36 as shown in FIG. 1. Referring to FIG. 2, a pair of cylindrical members 110 extend rearwardly from the panel mounting flange 108. A threaded aperture 112 is provided through each of the mounting members 110 and the flange 108 to receive a fastener (not shown) for mounting the receptacle connector 12 to a panel. A board mounting flange 114 rearwardly extending from panel mounting flange 108 includes a pair of apertures 116, 116 and a pair of mounting lugs 118, 118 (FIG. 4) extending downwardly from the housing 36, for example for positioning within a printed circuit board (not shown).

Referring now to FIG. 2, the outside surface 48 of rear wall 42 is provided with a plurality of rearwardly projecting wall members including a pair of parallel, spaced horizontally extending wall members 120 and 122 each joined at one end adjacent housing sidewall 102 by a vertically extending end wall member 124. Wall members 120–124 cooperatively define a shroud providing an open-ended generally rectangular enclosure 126 for receiving a portion of switch assembly 96 having an open end 128. The outer edge portions of wall members 120–124 include a stepped shoulder 130 for receiving a switch shielding plate 132. Wall members 120 and 122 are each provided with a pair of staking tabs 134, 134 and 136, 136, respectively. A projecting switch mounting pin 138 extends within switch enclosure 126 disposed adjacent end wall member 124. A switch aperture 140 having a diameter, e, extending through rear wall 42 within enclosure 126 at a point intermediate end wall 124 and open end 128 and displaced from open end 128 by a distance, f.

Outside surface 48 of rear wall 42 is also provided with four parallel spaced vertical wall members 142–148 extending between wall member 122 and housing bottom wall 106. Vertical wall members 142–148 are each provided with staking tab projections 150 as shown. Vertical wall members 142–148 cooperatively define three OED mounting recesses 152–156, each adapted to closely receive an OED 46. Light interface apertures 44 each having a diameter, d, extend through rear wall 42 disposed within OED mounting recesses 152–156 in spaced alignment as shown.

Zinc die cast receptacle housing 36 is additionally provided with three integral tubular projections 52 extending forwardly from rear wall 42 into plug receiving socket 38, as shown in FIGS. 1 and 5–6. Tubular projections 52 are each coaxially aligned with and surround a light interface aperture 44. Each tubular projection 52 is provided with a length, l, and has an internal diameter, g, dimensioned to closely slideably receive the ends 20 of insulated optical fibers 18. Each tubular projection 52 includes a tapered entrance 158 to provide unobstructed sliding insertion of optical fiber ends 20 into tubular projections 52.

Figure 3:
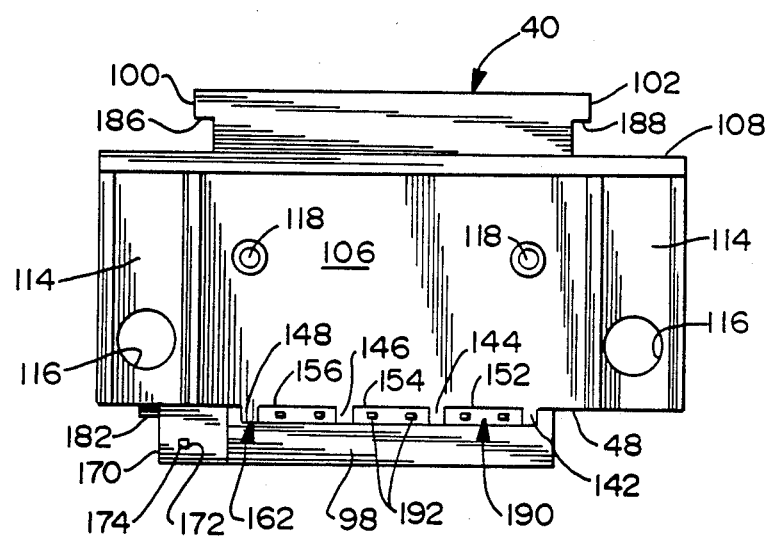
FIG. 3 is an enlarged bottom elevational view of a fiber optic receptacle connector of the assembly of FIG. 1.
Figure 4:
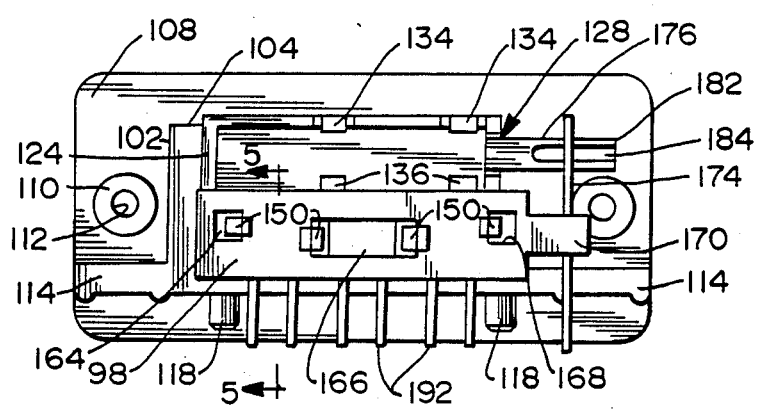
FIG. 4 is an enlarged rear elevational view of the assembled fiber optic receptacle connector of the assembly of FIG. 1.

Receptacle connector 12 also includes an OED retainer 98 best shown in FIGS. 2–3. As illustrated therein, OED retainer 98 comprises an elongate generally rectangular insulative body, 160 including a U-shaped recess 162 and three staking tab receiving apertures 164, 166 and 168. A generally rectangular projection 170 extends from one end of body 160 including a mounting hole 172 adapted to receive a switch pin 174. In the embodiment shown, staking tab receiving aperture 166 is enlarged to receive the tabs 150 from inner vertical wall members 144 and 146, although four individual apertures, such as 164 and 168 may be provided in body 160 to receive each of tabs 150 extending from vertical wall members 142–148.

Receptacle connector 12 also includes a switch assembly 96 as shown in FIGS. 2,4 and 7–8. Switch assembly 96 includes an elongate switch arm or blade 176 having a mounting end 178 with a mounting aperture 180 and an opposed end 182 including a rounded contact portion 184. Switch assembly 96 also includes a metallic switch shielding plate 132 and an elongate rectangular switch contact pin 168.

Receptacle connector 12 may be assembled by inserting switch arm 170 into enclosure 126 so that switch arm 170 lies against rear wall 42 and switch mounting pin 138 extends through mounting hole 174 in switch arm 170. Switch arm 170 may then be cantilever mounted against rear wall 42 by staking over the tip of mounting pin 138. In mounted position, switch arm 170 is biased against rear wall 42 and covers switch aperture 140 in rear wall 42. The free end 176 with rounded contact portion 178 extends laterally through the open end 128 of enclosure 126 to a point spaced from receptacle housing sidewall 100. Metallic switch shielding plate 132 may then be inserted into the plate-receiving recess provided by stepped shoulder 130. Staking tabs 134 and 136 may be staked over to fixedly mount the shielding plate 132 in position over the switch enclosure 126.

As shown in FIGS. 2 and 5, three OEDs 46 are provided for mounting to the receptacle housing 36. Each OED 46 includes a generally thin rectangular body 190 having a semi-spherical lens 50 projecting from a major face thereof and a pair of OED leads 192 extending therefrom for electrically connecting the OED to another circuit member, such as to conductive regions on a printed circuit board. OEDs 46 may comprise optical transmitters or receivers or a combination thereof. A preferred OED for use with the connector assembly of this invention is an OED type HFE4023, commercially available from Honeywell, Inc.

OEDs 46 are inserted into OED receiving recesses 152-156 defined on the outside surface 48 of rear wall 42. Light interface apertures 44 are dimensioned to closely coaxially receive each OED lens 50, so that each lens 50 extends within aperture 44 as shown in FIG. 5.

Switch pin 174 is press fit into mounting hole 172 in projection 170 of OED retainer 98. The OED retainer 98 is thereafter pressed into position against the OEDs 48 and rear wall 42 so that staking tabs 150 extend within staking apertures 164-178. As shown in FIGS. 2-4 and 7-8, staking tabs 150 are then staked over to fixedly mount OEDs 46 and retainer 98 to housing 36 with the lenses 50 in coaxial alignment within apertures 44.

As will be readily apparent to those skilled in this art, receptacle connector 12 may be mounted on a printed circuit board provided with a corresponding array of throughhole apertures adapted to receive OED leads 192 and switch pin 174 therein. A pair of mounting apertures may also be provided in the circuit board adapted to receive mounting lugs 118 to provide some stress isolation to the board-mounted OED leads 192. A fastening means such as a bolt or the like may be passed through apertures 116 in board mounting flange 114 to fixedly fasten the receptacle connector 12 and circuit board together. Thereafter, the connector and board may be fixedly mounted in a housing panel (not shown), by means of panel mounting flange 108 and mounting members 110, in a well known manner.

In accordance with the present invention, the plug connector 14 is mated with receptacle connector 12 by inserting the front end 24 of plug connector 14 into front opening 40 and advancing the plug connector 14 into the socket 38 towards rear wall 42 until latch wings 60 lockingly engage latch windows 186 and 188. In this mated position front end 24 is in biased abutting engagement with rear wall 42. Tubular projections 52 are received within enlarged channel portions 34 of the plug connector 14 and the ends 20 of optical fibers 18 are surrounded by tubular projections 52 and disposed in abutting coaxial relation to apertures 44 and OED lenses 50, as shown in FIG. 5.

Figures 7, 8:
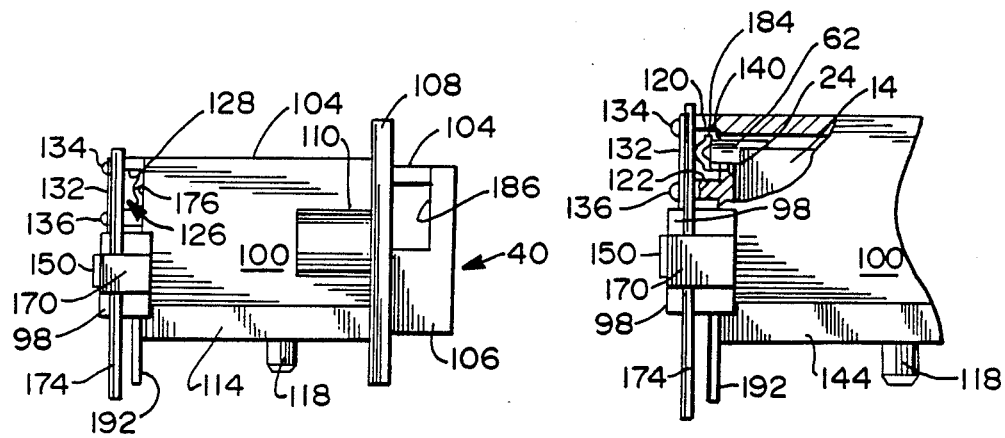
FIG. 7 is an enlarged side elevational view of the fiber optic receptacle connector of the assembly of FIG. 1.
FIG. 8 is an enlarged portion of FIG. 7 partially broken away to illustrate the operation of the switch assembly of the mated assembly of FIG. 1.

In the preferred embodiment, plug connector 14 is optionally provided with switch boss 62 extending forwardly from mating end 24. Upon insertion of the plug connector 14 to mated position, the switch boss 62 passes through switch aperture 140 provided in rearwall 42 into pressing engagement with switch arm 176. Switch boss 62 resiliently deflects switch arm 176 until the rounded contact portion 184 on the free end 182 of switch arm 176 is brought into electrical engagement with switch pin 174 as shown in FIG. 8. The switch assembly 96 remains in a closed position until the latch arms 58 are flexed inwardly to disengage latch wings 60 from latch windows 186, 188 and plug connector 14 is withdrawn from socket 38.

If a plug connector 14 which has not been molded to include the optional switching boss 62 is mated with receptacle connector 12, switch arm 176 will not be rearwardly deflected and the switch assembly 96 will remain in an open position, as shown in FIG. 7. In accordance, with this aspect, a switching device integral to the interconnect arrangement is provided which may be used to transmit a single piece of identifying binary information to a CPU to which receptacle connector 12 is connected.

In the preferred embodiment shown herein, connector assembly 10 has been designed to provide maximum EMI emission shielding effectiveness by providing an electrically conductive metallic receptacle housing 36 which may be grounded through the panel to which it is mounted or otherwise. Every opening provided in the rear wall 42 of the plug receiving socket 38 is provided with an aperture geometry including an aperture length to aperture diameter ratio, sometimes referred to as an aspect ratio, of at least about 3:1.

More particularly, each light interface aperture 44 having a diameter, d, is effectively modified by the tubular projections 52 having a slightly larger internal diameter, g, and a length, l, into a tunnel-like geometry. In accordance with the invention the length l is designed to be at least three times as long as the diameter, d, is wide and preferably is at least about 3 times internal diameter, g, as well. It is believed that EMI emissions generated by a CPU within a broad range of frequencies on the rear side of rear wall 42 are substantially prevented from escaping into the socket 38 through apertures 44 by virtue of the aperture geometry which is provided with a 3:1 aspect ratio. In this manner, a broad range of EMI emission frequencies from the CPU, possibly providing detectable intelligence signals, can be substantially reduced or eliminated. The exact level of shielding which is achieved will depend upon the frequency or more accurately the wavelengths or range of EMI wavelengths desired to be blocked, and the aperture diameter, which in turn may be limited by the OED lens geometries which are commercially available.

In the preferred embodiment shown in the drawings for example, the OED lens 50 has a maximum diameter of between about 0.060 and 0.062 inches. Apertures 44 are provided with a diameter, d, of 0.063 inches and tubular projections 52 are provided with an internal diameter, g, of 0.092 inches and a length, l, of at least about 0.276 inches. This specific example is believed to a desired level of EMI emission reduction for a broad range of EMI frequencies. Other specific aperture geometries designed for other available OED lens configurations may also provide acceptable shielding levels for EMI frequencies as desired or required for a particular security need.

The switch aperture 140 in rear wall 42 is likewise provided with a geometry including a 3:1 aspect ratio. More particularly, with the switch shielding plate 132 installed, the switch enclosure 126 is completely surrounded by metal shielding, except at the opening provided at open end 128. The switch aperture diameter, e, is selected and is thereafter positioned in the rear wall spaced at distance from open end 128 so as to provide a length, f, between open end 128 and switch aperture 140, so that length, f, is at least about 3 times the width of switch aperture diameter, e. Furthermore, the aspect ratio of the switch aperture 140 provided by the shielded switch enclosure 126 is further characterized by at least one 90 degree bend. For EMI emissions to escape through the switch aperture 140, they must travel into open end 128, travel parallel to switch arm 176 and then make a right angle bend to exit through aperture 140.

Shielding of the receptacle connector 12 is further enhanced due to the fact that in use both the interface apertures 44, as well as the switch aperture 140, are obstructed. On the one hand, OEDs 46 and their associated internal leads 192 at least partially obstruct apertures 44 from the rear or CPU side of rear wall 42. On the other hand, switch aperture 140 is obstructed in use by switch arm 176 which is biased against rear wall 42, or by switch boss 62 projecting into switch aperture 140 from a mated plug connector 14.

In summary, the present invention provides a new and improved fiber optic connector assembly which aligns the ends of optical fibers in abutting coaxial relationship with the lenses of OEDs associated with another circuit member to provide for accurate high speed optical data transmission therebetween. In the preferred embodiment, a shielded optical fiber connector arrangement with an integral switch feature is provided characterized by reduced or eliminated EMI emission for connecting a CPU to peripheral equipment, by providing an optical fiber cable link instead of an electrical cable link and by providing the new and improved receptacle connector 12 to prevent escape of EMI from a CPU to the environment.

Although the present invention has been described with reference to a preferred embodiment, modifications or changes may be made therein by those skilled in this art without departing from the scope and spirit of the invention, as defined by the appended claims.

We claim:

1. A fiber optic receptacle connector for connecting at least one optical-electronic device of the type including a body with a major face and having a lens projecting from said face to at least one end of an optical fiber secured in a plug connector, said receptacle connector comprising;

a plug-receiving socket with a front opening and a rear wall, said rear wall including a corresponding number of spaced interface apertures, each interface aperture being aligned with and dimensioned to closely coaxially receive the projecting lens of one said optical-electronic device, said rear wall further including a corresponding number of tubular projections coaxially aligned with and surrounding each aperture extending forwardly into the plug-receiving socket, whereby, as a plug connector is inserted into the socket, each said optical fiber end is received and guided by a said tubular projection into abutting coaxial alignment with the aperture and lens, respectively.

2. A receptacle connector as in claim 1, wherein the housing is an integral unitary member.

3. A receptacle connector as in claim 1, wherein the housing is an integral, unitary electrically conductive member.

4. A receptacle connector as in claim 3, wherein each interface aperture has a diameter and each tubular projection has a length which is at least about three times said interface aperture diameter.

5. A receptacle connector as in claim 1, wherein the housing is an integral, unitary die cast zinc member.

6. A receptacle connector as in claim 1, wherein each tubular projection has an internal diameter dimensioned to closely slideably receive an end of an optical fiber.

7. A receptacle connector as in claim 1, wherein said rear wall includes an outside surface opposite the socket having at least one recess for receiving and positioning a said optical-electronic device so that the projecting lens is coaxially aligned with and received in an interface aperture.

8. A receptacle connector as in claim 7, further comprising mounting means for retaining the optical-electronic device in a said recess on the outside surface.

9. A fiber optic connector assembly for connecting the ends of one or more optical fibers to a corresponding number of optical-electronic devices, each optical-electronic device including a body with a major face and a lens projecting from said major face, said connector assembly comprising:

a plug connector including an elongate housing having a front mating end with an opening, a rear end with an opening and a corresponding number of fiber-receiving channels extending between said openings, each channel including an enlarged, generally cylindrical portion adjacent the front end wherein the fiber end is coaxially positioned; and a receptacle connector including a housing having a plug-receiving socket with a front opening and a rear wall, said rear wall including a corresponding number of spaced interface apertures, each interface aperture being aligned with and being dimensioned to closely coaxially receive the projecting lens of one said optical-electronic device, said rear wall further including a plurality of tubular projections coaxially aligned with and surrounding each aperture extending forwardly into the plug-receiving socket;

whereby, as the plug connector is inserted into the socket, the tubular projections are received within the enlarged portions of the fiber-receiving channels surrounding the fiber ends and the optical fiber ends are guided by the tubular projections into abutting coaxial alignment with the apertures and lenses, respectively.

10. A connector assembly in claim 9, wherein the receptacle housing is an integral unitary member.

11. A connector assembly as in claim 9, wherein the receptacle housing is an integral, unitary electrically conductive member.

12. A connector assembly as recited in claim 11, wherein each interface aperture has a diameter and each tubular projection has a length which is at about three times said interface aperture diameter.

13. A connector assembly as in claim 9, wherein the housing is an integral, unitary die cast zinc member.

14. A receptacle assembly as in claim 9, wherein each tubular projection has an internal diameter dimensioned to closely slideably receive an end of an optical fiber.

15. A receptacle assembly as in claim 9, wherein said rear wall includes an outside surface opposite the socket having at least one recess for receiving and positioning each said optical-electronic device so that the projecting lens is coaxially aligned with and received in an interface aperture.

16. A connector assembly as in claim 15, further comprising mounting means for retaining the optical-electronic devices in said recesses on said outside surface.

17. A connector assembly as recited in claim 16, wherein said mounting means comprises a plurality of staking tab projections rearwardly extending from said outside surface on opposed sides of each recess; and an elongate generally rectangular dielectric retainer member having a plurality of mounting apertures therethrough and received on said staking tab projections, said tab projections being staked over to retain the retainer member on said outside surface with each optical-electronic device supported therebetween.

18. A connector assembly as recited in claim 12, further including an integral switch assembly, said switch assembly comprising:

a switch aperture extending through the rear wall of the receptacle housing;

an elongate electrically conductive switch arm cantilever mounted at one end to an outside surface of the rear wall opposite the socket having an opposed free end with a contact portion extending beyond the receptacle housing, said switch arm being biased against the outside surface and overlying the switch aperture; and switch contact means rearwardly spaced from said switch arm and said outside surface and aligned with the contact portion on the free end of the switch arm;

said swtich arm being resiliently deflectable between a normally open position, wherein the switch arm is biased against the outside surface and the contact portion on the free end of the switch arm is spaced from said switch contact means, and a closed position, wherein the free end of the switch arm is rearwardly deflected away from the outside surface and the contact portion electrically engages the switch contact means.

19. A connector assembly as in claim 18, wherein said plug connector optionally further includes a forwardly projecting switch boss actuator extending from the front mating end which, upon mating of the plug connector with the receptacle connector, is received through said switch aperture into engagement with the switch arm to deflect the switch arm from said normally open position to said closed position.

20. A connector assembly as in claim 18, wherein said switch contact means comprises an elongate conductive switch pin mounted in said retainer member.

21. A connector assembly as in claim 9, further including an integral switch assembly, said switch assembly comprising:
a switch aperture extending through the rear wall of the receptacle housing;
an elongate electrically conductive switch arm cantilever mounted at one end to an outside surface of the rear wall opposite the socket having an opposed free end with a contact portion extending beyond the receptacle housing, said switch arm being biased against the outside surface and overlying the switch aperture; and
switch contact means rearwardly spaced from said switch arm and said outside surface and aligned with the contact portion on the free end of the switch arm;
said switch arm being resiliently deflectable between a normally open position, wherein the switch arm is biased against the outside surface and the contact portion on the free end of the switch arm is spaced from said switch contact means, and a closed position, wherein the free end of the switch arm is rearwardly deflected away from the outside surface and the contact portion electrically engages the switch contact means.

22. A connector assembly as in claim 21, wherein said plug connector optionally further includes a forwardly projecting switch boss actuator extending from the front mating end which, upon mating of the plug connector with the receptacle connector, is received through said switch aperture into engagement with the switch arm to low deflect the switch arm from said normally open position to said closed position.

* * * * *